US011124176B2

(12) United States Patent
Plianos et al.

(10) Patent No.: US 11,124,176 B2
(45) Date of Patent: Sep. 21, 2021

(54) METHOD AND APPARATUS FOR CONTROLLING ELECTRIC MACHINES

(71) Applicant: JAGUAR LAND ROVER LIMITED, Coventry (GB)

(72) Inventors: Alex Plianos, Coventry (GB); Matthew Hancock, Coventry (GB); Marco D'Amato, Coventry (GB)

(73) Assignee: Jaguar Land Rover Limited, Coventry (GB)

( * ) Notice: Subject to any disclaimer, the term of this patent is extended or adjusted under 35 U.S.C. 154(b) by 255 days.

(21) Appl. No.: 16/141,506

(22) Filed: Sep. 25, 2018

(65) Prior Publication Data
US 2019/0161076 A1    May 30, 2019

(30) Foreign Application Priority Data
Sep. 28, 2017   (GB) .................................... 1715702

(51) Int. Cl.
| | |
|---|---|
| *B60W 30/02* | (2012.01) |
| *B60K 17/348* | (2006.01) |
| *B60L 15/32* | (2006.01) |
| *B60W 50/00* | (2006.01) |
| *B60K 17/356* | (2006.01) |
| *B60W 10/04* | (2006.01) |

(Continued)

(52) U.S. Cl.
CPC .......... *B60W 30/02* (2013.01); *B60K 17/348* (2013.01); *B60K 17/356* (2013.01);
(Continued)

(58) Field of Classification Search
CPC ...... B60W 30/02; B60W 10/04; B60W 20/10; B60W 50/0097; B60K 17/348; B60K 17/356; B60L 15/32
(Continued)

(56) References Cited

U.S. PATENT DOCUMENTS

| | | | |
|---|---|---|---|
| 6,958,587 B1 | 10/2005 | Naik | |
| 2005/0184716 A1* | 8/2005 | Brown | .................... H02M 1/38 |
| | | | 323/283 |
| 2009/0024263 A1* | 1/2009 | Simon, Jr. | ........... F02D 41/1497 |
| | | | 701/22 |

(Continued)

FOREIGN PATENT DOCUMENTS

| | | |
|---|---|---|
| AT | 513478 B1 | 6/2015 |
| EP | 2444273 A2 | 4/2012 |

(Continued)

OTHER PUBLICATIONS

Search and Examination Report, GB1715702.5, dated Mar. 19, 2018, 6 pages.

*Primary Examiner* — Krishnan Ramesh
(74) *Attorney, Agent, or Firm* — McCoy Russell LLP

(57) ABSTRACT

The present disclosure relates to a controller for controlling operation of at least first and second traction machines in a vehicle. The controller includes a processor configured to predict an operating temperature of each of said at least first and second traction machines for at least a portion of a current route. The processor determines at least first and second torque requests for said at least first and second traction machines. The at least first and second torque requests are determined in dependence on the predicted operating temperatures of the at least first and second traction machines. The processor generates at least first and second traction motor control signals in dependence on the determined at least first and second torque requests. The present disclosure also relates to method of controlling at least first and second traction machines in a vehicle.

18 Claims, 8 Drawing Sheets

(51) Int. Cl.
*B60L 15/20* (2006.01)
*B60W 20/10* (2016.01)
*B60K 6/52* (2007.10)

(52) U.S. Cl.
CPC ......... *B60L 15/2045* (2013.01); *B60L 15/32* (2013.01); *B60W 10/04* (2013.01); *B60W 20/10* (2013.01); *B60W 50/0097* (2013.01); *B60K 6/52* (2013.01); *B60L 15/2009* (2013.01); *B60L 2220/42* (2013.01); *B60L 2240/423* (2013.01); *B60L 2240/425* (2013.01); *B60L 2240/485* (2013.01); *B60L 2240/622* (2013.01); *B60L 2250/26* (2013.01); *B60W 2510/087* (2013.01); *B60W 2520/10* (2013.01); *B60W 2520/105* (2013.01); *B60W 2520/125* (2013.01); *B60W 2552/40* (2020.02); *B60W 2710/083* (2013.01); *B60W 2710/088* (2013.01); *B60Y 2200/91* (2013.01); *B60Y 2200/92* (2013.01); *B60Y 2300/02* (2013.01); *B60Y 2400/82* (2013.01)

(58) Field of Classification Search
USPC .......................................................... 701/22
See application file for complete search history.

(56) References Cited

U.S. PATENT DOCUMENTS

| | | | |
|---|---|---|---|
| 2009/0118884 A1* | 5/2009 | Heap | B60W 10/06 701/22 |
| 2009/0118918 A1* | 5/2009 | Heap | B60W 10/10 701/54 |
| 2013/0255603 A1* | 10/2013 | Pursifull | F01P 11/16 123/41.15 |
| 2014/0039710 A1* | 2/2014 | Carter | G05B 19/0428 700/291 |
| 2014/0343077 A1 | 11/2014 | Sponheimer et al. | |
| 2015/0066236 A1* | 3/2015 | Gehring | G01C 21/3469 701/1 |
| 2015/0166072 A1* | 6/2015 | Powers | G08G 1/0129 701/1 |
| 2015/0197225 A1* | 7/2015 | Raste | B60W 50/14 701/72 |
| 2015/0251658 A1* | 9/2015 | Kato | B60T 8/172 701/22 |
| 2015/0298574 A1 | 10/2015 | Bramson | |
| 2016/0009268 A1 | 1/2016 | Tamai et al. | |
| 2017/0174097 A1 | 1/2017 | Gillespey et al. | |
| 2017/0151955 A1* | 6/2017 | Offenhaeuser | B60W 40/068 |
| 2017/0259817 A1* | 9/2017 | Horiguchi | B60W 30/08 |
| 2018/0038709 A1* | 2/2018 | Takahashi | G08G 1/0141 |

FOREIGN PATENT DOCUMENTS

| | | |
|---|---|---|
| EP | 2738036 A3 | 6/2014 |
| GB | 2503725 A | 1/2014 |
| JP | 2004324613 A | 11/2004 |
| JP | 2015536128 A | 12/2015 |
| WO | 2012131953 A1 | 7/2014 |

* cited by examiner

METHOD AND APPARATUS FOR CONTROLLING ELECTRIC MACHINES

CROSS REFERENCE TO RELATED APPLICATION

This application claims priority to and the benefit of GB1715702.5, filed Sep. 28, 2017, which is incorporated herein by reference in its entirety.

TECHNICAL FIELD

The present disclosure relates to a method and apparatus for controlling electric machines. In particular, but not exclusively, the present disclosure relates to a method and apparatus for controlling the torque split between a plurality of electric machines. The method and apparatus have particular application in a vehicle for controlling the torque split between traction motors. Aspects of the invention relate to a controller for controlling at least first and second traction machines, to a vehicle comprising a controller, to a method of controlling at least first and second traction machines, and to a non-transitory computer-readable medium.

BACKGROUND

It is known to provide a battery electric vehicle (BEV) with more than one electric traction machine for transmitting torque to one or more axles. By way of example, the vehicle may comprise a first electric machine for transmitting torque to a front axle; and a second electric machine for transmitting torque to a rear axle. This configuration offers various advantages in terms of performance, stability/traction, increased regenerative capacity during braking and overall efficiency. The torque distribution between the two axles is a non-trivial task that has to consider often conflicting attributes and constraints.

A vehicle energy management (VEM) system is provided to control operation of the systems in the BEV. The VEM system seeks to optimise the coordination and operation of various vehicle systems, such as: the propulsion (traction) system, cooling systems, high voltage (HV) battery cooling system, and heating ventilation and air conditioning (HVAC).

At least in certain embodiments, the current invention seeks to provide efficient control of a vehicle drivetrain.

SUMMARY OF THE INVENTION

Aspects of the present invention relate to a controller, a vehicle, a method and a non-transitory computer-readable medium as claimed in the appended claims.

According to a further aspect of the present invention there is provided a controller for controlling operation of at least first and second traction machines in a vehicle, the controller comprising a processor configured to:

predict an operating temperature of each of said at least first and second traction machines for at least a portion of a current route;

determine at least first and second torque requests for said at least first and second traction machines, the at least first and second torque requests being determined in dependence on the predicted operating temperatures of the at least first and second traction machines; and generate at least first and second traction motor control signals in dependence on the determined at least first and second torque requests. At least in certain embodiments the controller uses route-ahead information to predict the thermal behaviour of said at least first and second traction machines. The controller thereby gains situational awareness and, at least in certain embodiments, may dynamically adapt the control system to improve the efficiency with which is energy is used. The controller seeks to detect segments of the current route where the temperature of one or more of the at least first and second electric machines may increase beyond a predetermined threshold. By anticipating the predicted thermal behaviour, at least in certain embodiments the controller may control operation of said at least first and second traction machines more efficiently during at least part of the current journey.

At least in certain embodiments, the controller may identify one or more opportunities to modify the torque split between said at least first and second electric machines to balance the thermal load on said first and second electric machines. By identifying any such opportunity in advance, the controller can pre-emptively increase the proportion of the total requested torque generated by one or more of said at least first and second electric machines, for example to prevent the predicted operating temperature of one of the at least first and second electric machines exceeding a temperature threshold.

The at least first and second traction machines may each comprise an electric machine. Each electric machine may be connected to an inverter connected to a traction battery. The traction machines may each be incorporated into an electrical drive unit (EDU).

The at least first and second torque requests may comprise a scalar, for example represented by a real number. The at least first and second torque requests may comprise positive (+ve) or negative (−ve) variables to represent the direction in which the torque is to be applied.

The processor may be configured to determine at least first and second power loss penalties in dependence on the predicted operating temperatures of the at least first and second traction machines. The at least first and second power loss penalties may be proportional to the predicted operating temperature or a predicted rate of change of the operating temperature of the at least first and second traction machines. The at least first and second power loss penalties may be directly proportional to the predicted operating temperature or a predicted rate of change of the operating temperature of the at least first and second traction machines.

The processor may be configured to determine the at least first and second torque requests in dependence on said at least first and second power loss penalties.

The processor may be configured to determine a first predicted time (or first predicted times) when the operating temperature of the first traction machine is predicted to exceed a first temperature threshold. The processor may be configured to increase or apply the first power loss penalty a predetermined first time period prior to said first predicted time. The duration of the first time period may be proportional to the predicted operating temperature and/or a predicted rate of change of the operating temperature of the first traction machine.

Alternatively, or in addition, the processor may be configured to determine a first predicted geospatial location (or plurality of first predicted geospatial locations) where the operating temperature of the first traction machine is predicted to exceed a first temperature threshold. The processor may be configured to increase or apply the first power loss penalty a predetermined first time period prior to the vehicle arriving at said first predicted geospatial location or a first distance before said first predicted geospatial location on the current route. The length of the first distance may be proportional to the predicted operating temperature and/or a predicted rate of change of the operating temperature of the first traction machine.

The processor may be configured to determine a second predicted time when the operating temperature of the second traction machine is predicted to exceed a second temperature threshold. The processor may be configured to increase the second power loss penalty a predetermined second time period prior to said second predicted time. The duration of the second time period may be proportional to the predicted operating temperature and/or a predicted rate of change of the operating temperature of the second traction machine.

Alternatively, or in addition, the processor may be configured to determine a second predicted geospatial location (or a plurality of second predicted geospatial locations) where the operating temperature of the second traction machine is predicted to exceed a second temperature threshold. The processor may be configured to increase or apply the second power loss penalty a predetermined second time period prior to the vehicle arriving at said second predicted geospatial location or a second distance before said second predicted geospatial location on the current route. The length of the second distance may be proportional to the predicted operating temperature and/or a predicted rate of change of the operating temperature of the second traction machine.

At least in certain embodiments, the processor may be configured to determine a first power loss penalty in dependence on a predicted operating temperature of the first traction machine; and/or to determine a second power loss penalty in dependence on a second predicted operating temperature of the second traction machine. The processor may be configured to determine a first predicted time when the operating temperature of the first traction machine is predicted to exceed a first temperature threshold. The processor may apply the first power loss penalty a predetermined first time period prior to said first predicted time. The duration of the first time period may be proportional to the predicted operating temperature and/or a predicted rate of change of the operating temperature of the first traction machine. Alternatively, or in addition, the processor may be configured to determine a second predicted time when the operating temperature of the second traction machine is predicted to exceed a second temperature threshold. The processor may apply the second power loss penalty a predetermined second time period prior to said second predicted time. The duration of the second time period may be proportional to the predicted operating temperature and/or a predicted rate of change of the operating temperature of the second traction machine.

The comments herein in respect of determining a first power loss penalty in respect of a predicted operating temperature of the first traction machine may also apply to a predicted temperature of a first electric drive unit (EDU) comprising or consisting of a first inverter for the first traction machine. The processor may be configured to determine a first power loss penalty in dependence on a predicted operating temperature of the first EDU. The comments herein in respect of determining a second power loss penalty in respect of a predicted operating temperature of the second traction machine may also apply to a predicted temperature of a second electric drive unit (EDU) comprising or consisting of a second inverter for the second traction machine. The processor may be configured to determine a second power loss penalty in dependence on a predicted operating temperature of the second EDU. The processor may be configured to determine a first predicted time when the operating temperature of the first EDU is predicted to exceed a first temperature threshold. The processor may apply the first power loss penalty a predetermined first time period prior to said first predicted time. The duration of the first time period may be proportional to the predicted operating temperature and/or a predicted rate of change of the operating temperature of the first EDU. Alternatively, or in addition, the processor may be configured to determine a second predicted time when the operating temperature of the second EDU is predicted to exceed a second temperature threshold. The processor may apply the second power loss penalty a predetermined second time period prior to said second predicted time. The duration of the second time period may be proportional to the predicted operating temperature and/or a predicted rate of change of the operating temperature of the second EDU.

The processor may be configured to predict the operating temperature of the at least first and second traction machines in dependence on an expected load of each of the at least first and second traction machines. The load on said at least first and second traction machines may be predicted in dependence on one or more of the following set: vehicle location data, driving speed, reference data relating to known geographical features, driving routes, speed limits, known or detected road conditions which may place particular or special power or load demands, battery state of charge (SOC), external ambient air temperature or other climatic conditions and estimated road-load.

The processor may be configured to pre-emptively control one or more vehicle cooling subsystems in dependence on the predicted operating temperatures of the at least first and second traction machines. The processor may be configured to actuate the one or more vehicle cooling subsystems to provide cooling in dependent on the predicted operating temperatures of the at least first and second traction machines. The one or more vehicle cooling subsystems may comprise one or more of the following set: a heat exchanger, such as a radiator; a cooling fan; a coolant pump; and an active aerodynamic vane.

The processor may be configured to predict vehicle stability for at least the portion of a current route. The processor may determine the at least first and second torque requests in dependence on the predicted vehicle stability.

According to a further aspect of the present invention there is provided a controller for controlling operation of at least first and second traction machines in a vehicle, the controller comprising a processor configured to predict vehicle stability for at least a portion of a current route. The processor may determine at least first and second torque requests for said at least first and second traction machines. The at least first and second torque requests may be determined in dependence on the predicted vehicle stability. At least first and second traction motor control signals may be generated in dependence on the determined at least first and second torque requests.

The vehicle stability may be predicted in dependence on one or more of the following: a vehicle speed profile, a longitudinal acceleration profile, a lateral acceleration profile, and a coefficient of friction ($\mu$).

According to a further aspect of the present invention there is provided a vehicle comprising a controller as described herein.

According to a further aspect of the present invention there is provided a method of controlling operation of at least first and second traction machines in a vehicle, the method comprising:

predicting an operating temperature of each of said at least first and second traction machines for at least a portion of a current route;

determining at least first and second torque requests for said at least first and second traction machines, the at least first and second torque requests being determined in dependence on the predicted operating temperatures of the at least first and second traction machines; and controlling said at least first and second traction motor control signals in dependence on the determined at least first and second torque requests.

The method may comprise determining at least first and second power loss penalties in dependence on the predicted operating temperatures of the at least first and second traction machines. The at least first and second power loss penalties may be proportional to the predicted operating temperature or a predicted rate of change of the operating temperature of the at least first and second traction machines. The at least first and second power loss penalties may be directly proportional to the predicted operating temperature or a predicted rate of change of the operating temperature.

The method may comprise determining the at least first and second torque requests in dependence on said at least first and second power loss penalties.

The method may comprise determining a first predicted time when the operating temperature of the first traction machine is predicted to exceed a first temperature threshold. The method may comprise increasing the first power loss penalty a predetermined first time period prior to said first predicted time. The duration of the first time period may be proportional to the predicted operating temperature and/or a predicted rate of change of the operating temperature of the first traction machine.

Alternatively, or in addition, the method may comprise determining a first predicted geospatial location (or plurality of first predicted geospatial locations) where the operating temperature of the first traction machine is predicted to exceed a first temperature threshold. The method may comprise increasing the first power loss penalty a predetermined first time period prior to the vehicle arriving at said first predicted geospatial location or a first distance before said first predicted geospatial location on the current route. The length of the first distance may be proportional to the predicted operating temperature and/or a predicted rate of change of the operating temperature of the first traction machine.

The method may comprise determining a second predicted time when the operating temperature of the second traction machine is predicted to exceed a second temperature threshold. The method may comprise increasing the second power loss penalty a predetermined second time period prior to said second predicted time. The duration of the second time period may be proportional to the predicted operating temperature and/or a predicted rate of change of the operating temperature of the second traction machine.

Alternatively, or in addition, the method may comprise determining a second predicted geospatial location (or a plurality of second predicted geospatial locations) where the operating temperature of the second traction machine is predicted to exceed a second temperature threshold. The method may comprise increasing the second power loss penalty a predetermined second time period prior to the vehicle arriving at said second predicted geospatial location or a second distance before said second predicted geospatial location on the current route. The length of the second distance may be proportional to the predicted operating temperature and/or a predicted rate of change of the operating temperature of the second traction machine.

The method may comprise predicting the operating temperature of the at least first and second traction machines in dependence on an expected load of each of the at least first and second traction machines. The load on said at least first and second traction machines is predicted in dependence on one or more of the following set: vehicle location data, driving speed, reference data relating to known geographical features, driving routes, speed limits, known or detected road conditions which may place particular or special power or load demands, battery state of charge (SOC), external ambient air temperature or other climatic conditions, and estimated road-load.

The method may comprise pre-emptively controlling one or more vehicle cooling subsystems in dependence on the predicted operating temperatures of the at least first and second traction machines. The method may comprise actuating the one or more vehicle cooling subsystems to provide cooling in dependent on the predicted operating temperatures of the at least first and second traction machines. The one or more vehicle cooling subsystems may comprise one or more of the following set: a cooling fan, a coolant pump and an active aerodynamic vane.

The method may comprise predicting vehicle stability for at least the portion of a current route. The method may comprise determining the at least first and second torque requests in dependence on the predicted vehicle stability.

According to a further aspect of the present invention, there is provided a method of controlling operation of at least first and second traction machines in a vehicle. The method may comprise predicting vehicle stability for at least a portion of a current route. At least first and second torque requests may be determined for said at least first and second traction machines. The at least first and second torque requests may be determined in dependence on the predicted vehicle stability. The method may comprise controlling said at least first and second traction motor control signals in dependence on the determined at least first and second torque requests.

The method may comprise predicting vehicle stability in dependence on one or more of the following: a vehicle speed profile, a longitudinal acceleration profile, a lateral acceleration profile, and a coefficient of friction ($\mu$).

According to a further aspect of the present invention, there is provided a non-transitory computer-readable medium having a set of instructions stored therein which, when executed, cause a processor to perform the method described herein.

Any control unit or controller described herein may suitably comprise a computational device having one or more electronic processors. The system may comprise a single control unit or electronic controller or alternatively different functions of the controller may be embodied in, or hosted in, different control units or controllers. As used herein the term "controller" or "control unit" will be understood to include both a single control unit or controller and a plurality of control units or controllers collectively operating to provide any stated control functionality. To configure a controller or control unit, a suitable set of instructions may be provided which, when executed, cause said control unit or computational device to implement the control techniques specified herein. The set of instructions may suitably be embedded in said one or more electronic processors. Alternatively, the set of instructions may be provided as software saved on one or more memory associated with said controller to be executed on said computational device. The control unit or controller may be implemented in software run on one or more processors. One or more other control unit or controller may be implemented in software run on one or more processors, optionally the same one or more processors as the first controller. Other suitable arrangements may also be used.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the present invention will now be described, by way of example only, with reference to the accompanying figures, in which.

DETAILED DESCRIPTION

Figure 1:
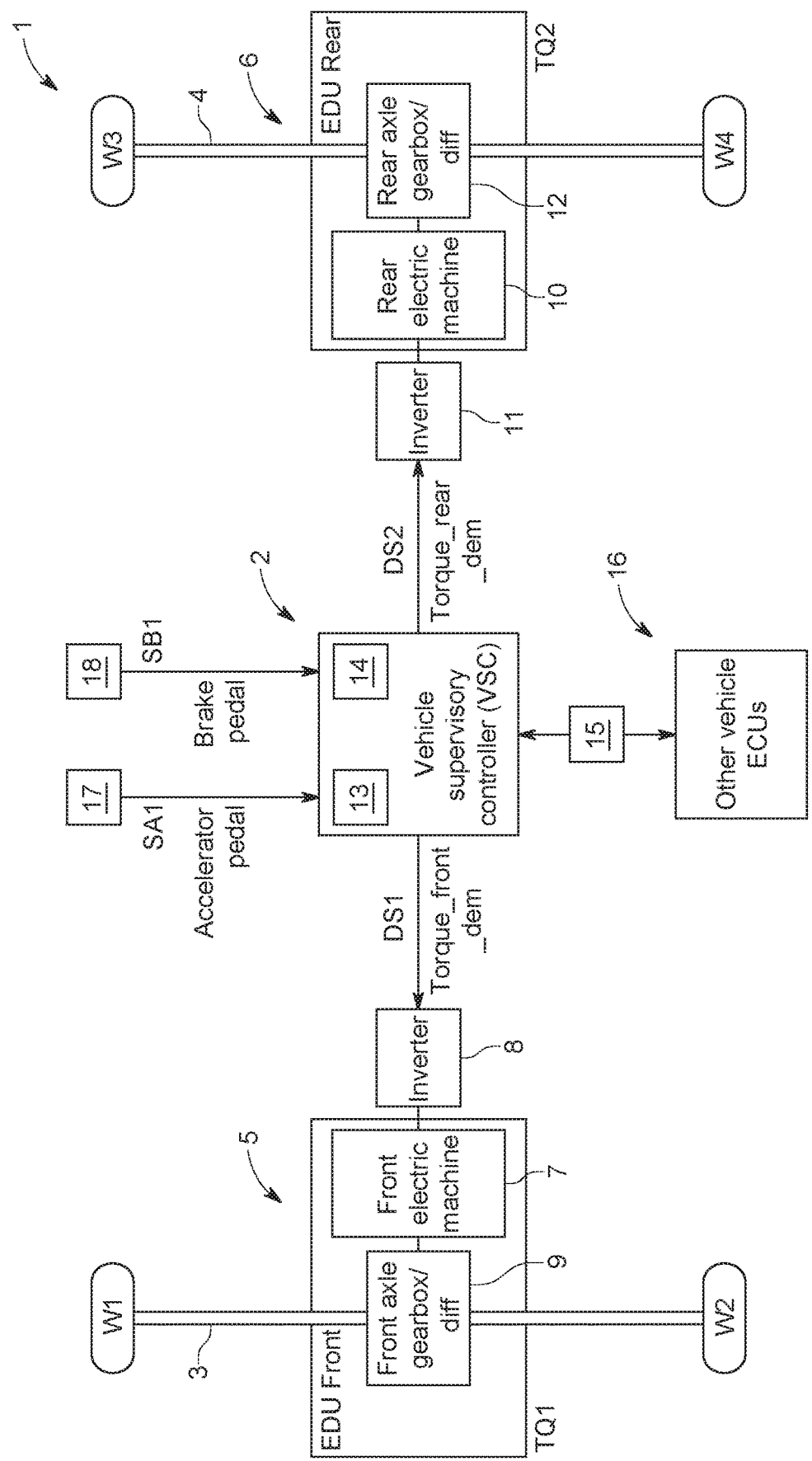
FIG. 1 shows a schematic representation of a vehicle incorporating a controller for controlling a torque split between first and second electric machines in accordance with an aspect of the present invention.

A vehicle 1 incorporating a controller 2 in accordance with an aspect of the present invention will now be described with reference to the accompanying figures. The vehicle 1 in the present embodiment is a battery electric vehicle, but the techniques and apparatus described herein are applicable in other types of vehicle, such as a hybrid electric vehicle (HEV) or plug-in hybrid electric vehicle (PHEV). As shown in FIG. 1, the vehicle 1 in the present embodiment has four wheels W1-4 mounted on front and rear axles 3, 4. The vehicle 1 in the present embodiment is a four-wheel drive vehicle and, in use, torque is selectively transmitted to each of the wheels W1-4 to propel the vehicle 1. The vehicle 1 may, for example, be an automobile, a utility vehicle or a sports utility vehicle.

The vehicle 1 comprises a first electric drive unit (EDU) 5 for transmitting a first torque T1 to the front axle 3; and a second EDU 6 for transmitting a second torque T2 to the rear axle 4. In the present embodiment, the first EDU 5 is operable to transmit a front torque TQ1 to the front wheels W1, W2 of the vehicle 1; and the second EDU 6 is operable to transmit a rear torque TQ2 to the rear wheels W3, W4 of the vehicle 1. The term "front torque" used herein refers to the torque applied at the front axle 3; and the term "rear torque" used herein refers to the torque applied at the rear axle 4. The aggregate of the front and rear torques TQ1, TQ2 is at least substantially equal to a total requested torque TQ. The front and rear torques TQ1, TQ2 may be expressed as a percentage of the total requested torque TQ. The front and rear torques TQ1, TQ2 are complementary and, when combined, are at least substantially equal to the total requested torque TQ (i.e. 100%). The total requested torque may be generated in dependence on a driver torque request.

The first EDU 5 comprises a first electric machine 7, a first inverter 8 and a first gearbox/differential 9. The second EDU 6 comprises a second electric machine 10, a second inverter 11 and a second gearbox/differential 12. The first and second electric machines 7, 10 are traction motors for generating torque to propel the vehicle 1. The first and second electric machines 7, 10 each comprise a rotor and a stator (not shown). The first and second electric machines 7, 10 may, for example, be permanent-magnet synchronous motors (PMSM). The first and second inverters 8, 11 are connected to a traction battery (not shown) for supplying power to the first and second electric machines 7, 10. The first and second inverters 8, 11 also perform DC to AC conversion for AC motors. The controller 2 is configured to output front and rear torque demand signals DSF1, DSF2 to control operation of the first and second EDUs 5, 6. As described herein, the front and rear torque demand signals DSF1, DSF2 control operation of the first and second electric machines 7, 10. The controller 2 may thereby control the first and second torques T1, T2 transmitted to the front and rear axles 3, 4.

The controller 2 in accordance with the present embodiment is the vehicle stability controller (VSC). The controller 2 comprises an electronic processor 13 coupled to a memory device 14. The memory device 14 comprises a set of non-transitory instructions which, when executed, cause the electronic processor 13 to perform the method(s) described herein. The controller 2 is connected to an interface 15, such as a communication bus, to communicate with electronic control units (ECUs) provided in the vehicle 1. The ECUs are denoted generally by the reference numeral 16 in FIG. 1. The controller 2 is configured to receive an accelerator signal SA1 from an accelerator pedal sensor 17 associated with an accelerator pedal (not shown) provided in the vehicle 1. The controller 2 is configured also to receive a brake signal SB1 from a brake pedal sensor 18 associated with a brake pedal (not shown) provided in the vehicle 1.

Figure 2:
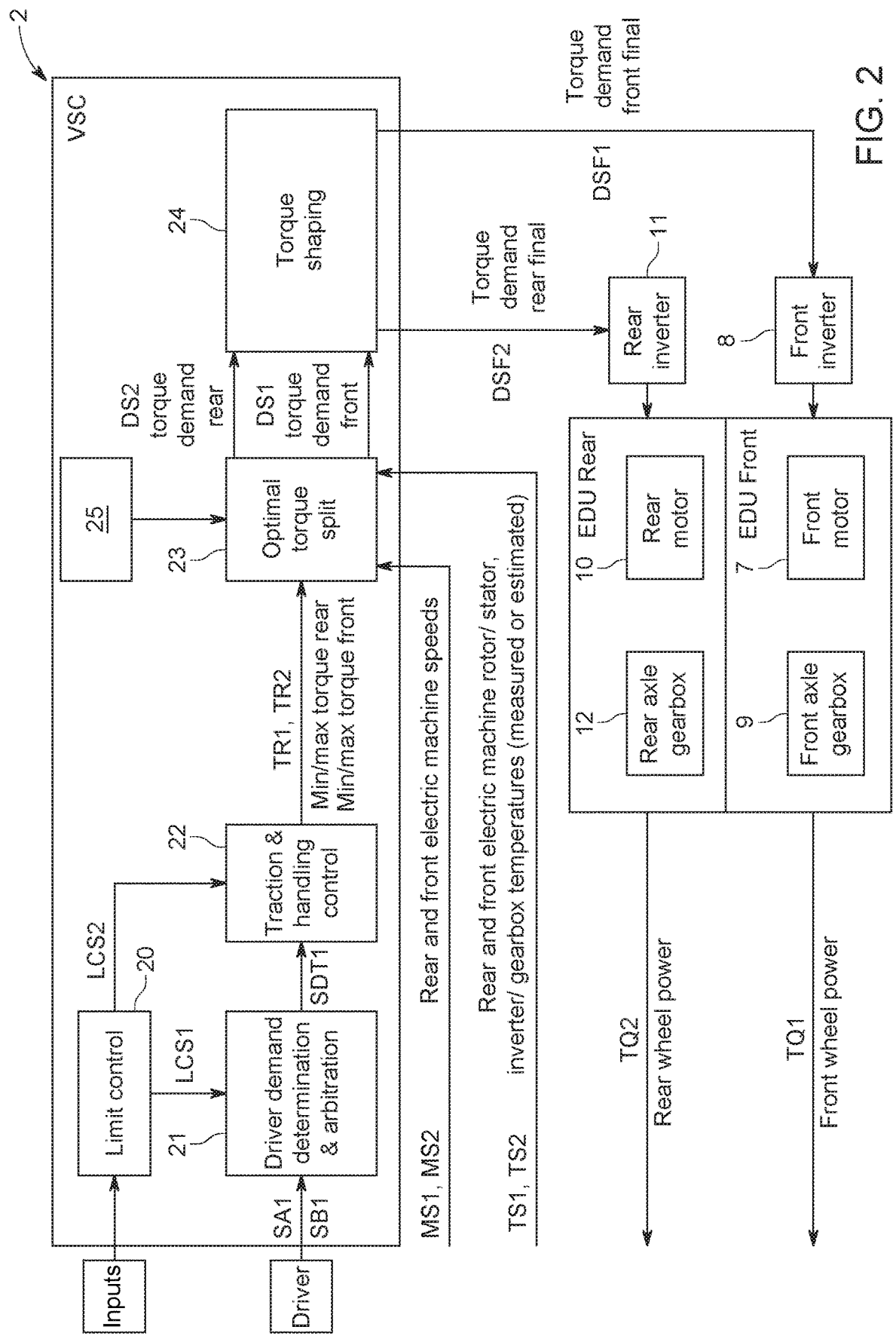
FIG. 2 shows a first block diagram illustrating the relationship between the controller and the first and second electric machines shown in FIG. 1.

A schematic representation of the controller 2 is shown in FIG. 2. The controller 2 is configured to implement a limit control module 20, a driver demand determination and arbitration module 21, a traction and handling control module 22, a torque split module 23, and a torque shaping module 24. The limit control module 20 receives maximum and minimum limits from controllers (not shown) associated with the first and second inverters 8, 11. In some applications, the limit control module 20 may receive a pair of inverter limits for each of the first and second electric machines 7, 10 to describe peak capability (i.e. motor/inverter capability for a short duration of time) and continuous capability (i.e. motor/inverter capability for indefinite operation). The limit control module 20 also receives a power limit from the traction battery and converts this to an equivalent torque limit for each of the first and second electric machines 7, 10, for example by partitioning the power limit according to a current torque split between said first and second electric machines 7, 10. The limit control module 20 may generate a maximum and minimum limit for each of the first and second electric machines 7, 10 in dependence on one or more of these limits. The limit control module 20 generates first and second limit control signals LCS1, LCS2. The first limit control signal LCS1 represents the combined powertrain maximum and minimum limits. The second limit control signal LCS2 comprises maximum and minimum limits for each of the first and second electric machines 7, 10 at the wheel frame of reference, i.e. actuator limits converted to wheel frame of reference by accounting for the transmission ratio and losses.

The first and second limit control signals LCS1, LCS2 are output to the driver demand determination and arbitration module 21 and the traction and handling control module 22 respectively. The driver demand determination and arbitration module 21 receives driver inputs, including the accelerator signal SA1 and the brake signal SB1. The driver demand determination and arbitration module 21 is operative to generate a torque demand signal SDT1 in dependence on the accelerator signal SA1 and the brake signal SB1. The torque demand signal SDT1 comprises a total requested torque to be transmitted to the front and rear axles 3, 4 as a traction torque or a regenerative torque. The total requested torque may be a positive (accelerating) torque (+ve) for transmitting a drive torque to the wheels W1-4; or a negative (braking) torque (−ve) for transmitting a braking or regenerative torque to the wheels W1-4. It will be understood that the vehicle 1 may decelerate if the positive (+ve) torque request is less than the overall vehicle losses, which may occur, for example, when the vehicle 1 is ascending a gradient. Conversely, the vehicle 1 may accelerate if the negative (−ve) torque request is less than the overall vehicle gains, which may occur, for example, when the vehicle 1 is descending a gradient. The total requested torque may be generated in dependence on a cruise control system or an adaptive cruise control system. The present invention may be implemented in conjunction with an autonomous or semi-autonomous control module(s) which may at least generate the total requested torque. The torque demand signal SDT1 is output to the traction and handling control module 22. The torque split module 23 is operative to control the torque transmitted to the front and rear axles 3, 4 to meet the total requested torque.

The traction and handling control module 22 is configured to determine a torque distribution between the front and rear axles 3, 4 (i.e. a torque split between the front and rear axles 3, 4) suitable for maintaining dynamic stability of the vehicle 1. The traction and handling control module 22 is configured to determine first and second torque ranges TR1, TR2 which define respective first and second ranges of the torque to be transmitted to the front and rear axles 3, 4 respectively. The first torque range TR1 may comprise a minimum value TQ1(MIN) and a maximum value TQ1(MAX); and the second torque range TR2 may comprise a minimum value TQ2(MIN) and a maximum value TQ21(MAX). The first and second torque ranges TR1, TR2 in the present embodiment are expressed as a percentage of the total requested torque TQ. In alternative embodiments, the first and second torque ranges TR1, TR2 may be expressed as torque values. The minimum value TQ1(MIN) of the first torque range TR1 and the minimum value of the second torque range TQ2(MIN) are both greater than or equal to zero (0) when the total requested torque TQ is greater than or equal to zero (0). The maximum value TQ1(MAX) of the first torque range TR1 and the maximum value of the second torque range TQ2(MAX) are both less than or equal to zero (0) when the total requested torque TQ is less than or equal to zero (0). The front and rear torques TQ1, TQ2 are complementary and, when combined, are at least substantially equal to the total requested torque TQ (i.e. 100%). The first and second torque ranges TR1, TR2 may be predefined, for example in dependence on detected operating conditions or driving modes. The traction and handling control module 22 combines the first and second limit control signals LCS1, LCS2 from the limit control module 20 with internally generated limits for stability and/or traction. Examples of traction and handling control include:

Pedal Position

The traction and handling control module 22 may determine the torque distribution between the front and rear axles 3, 4 in dependence on the accelerator pedal position and/or the brake pedal position. The traction and handling control module 22 may determine the extent of the first torque range TR1 and/or the second torque range TR2 in dependence on the accelerator pedal position and/or the brake pedal position. By way of example, the extent of the first and second torque ranges TR1, TR2 may be inversely proportional to a magnitude of the brake torque request generated by depressing the brake pedal. Alternatively, or in addition, the traction and handling control module 22 may determine the extent of the first and second torque ranges TR1, TR2 in dependence on the rate of change of the accelerator pedal position and/or the brake pedal position. The extent of the first and second torque ranges TR1, TR2 may be inversely proportional to a brake torque request generated by depressing the brake pedal. Any changes made to the torque distribution and/or the extent of the first and second torque ranges TRT1, TR2 may be made progressively.

Vehicle Dynamics

The traction and handling control module 22 may determine the torque distribution between the front and rear axles 3, 4 in dependence on the longitudinal acceleration and/or lateral acceleration of the vehicle 1. Alternatively, or in addition, the traction and handling control module 22 may determine the torque distribution between the front and rear axles 3, 4 in dependence on a vehicle speed profile and/or a coefficient of friction (μ). The traction and handling control module 22 may determine the extent of the first and second torque ranges TR1, TR2 in dependence on the longitudinal acceleration and/or lateral acceleration of the vehicle 1. Alternatively, or in addition, the traction and handling control module 22 may determine the extent of the first and second torque ranges TR1, TR2 in dependence on the rate of change of the longitudinal acceleration and/or lateral acceleration of the vehicle 1. The extent of the first and second torque ranges TR1, TR2 may be inversely proportional to the longitudinal acceleration and/or lateral acceleration. Any changes made to the torque distribution and/or the extent of the first and second torque ranges TRT1, TR2 may be made progressively. By way of example, at low longitudinal and lateral acceleration, the traction and handling control module 22 may allow 20-80%/80-20% front/rear torque distribution. In this scenario, the first torque range TR1 may comprise a minimum value TQ1_TEMP(MIN) of 20% of the total requested torque TQ and a maximum value TQ1_TEMP(MAX) of 80% of the total requested torque TQ; and the second torque range TR2 may comprise a minimum value TQ2_TEMP(MIN) of 20% of the total requested torque TQ and a maximum value TQ1_TEMP(MAX) of 80% of the total requested torque TQ. The traction and handling control module 22 may restrict the front-torque distribution. At high longitudinal and lateral accelerations, the extent of the first and second torque ranges TR1, TR2 may be reduced, for example to 70-100%/30-0% front/rear torque distribution. In this scenario, the first torque range TR1 may comprise a minimum value TQ1_TEMP (MIN) of 70% of the total requested torque TQ and a maximum value TQ1_TEMP(MAX) of 100% of the total requested torque TQ; and the second torque range TR2 may comprise a minimum value TQ2_TEMP(MIN) of 0% of the total requested torque TQ and a maximum value TQ1_TEMP(MAX) of 30% of the total requested torque TQ. TQ1_TEMPTQ1_TEMPTQ2_TEMPTQ2_TEMPAny changes made to the torque distribution and/or the extent of the first and second torque ranges TRT1, TR2 may be made progressively. It will be understood that the first and second torque ranges TR1, TR2 are non-zero. In certain scenarios, the traction and handling control module 22 may specify a discrete ratio for the front/rear torque distribution; this is outside the scope of at least certain aspects of the present invention.

Estimated Coefficient of Friction (μ)

The traction and handling control module 22 may estimate a coefficient of friction (μ) of the surface under the wheels W1-4 of the vehicle 1. The traction and handling control module 22 may control the torque distribution between the front and rear axles 3, 4 in dependence on the estimated coefficient of friction (μ). The traction and handling control module 22 may change the extent of the first and second torque ranges TR1, TR2 in dependence on changes in the longitudinal acceleration and/or lateral acceleration.

The first and second torque ranges TR1, TR2 each define minimum and maximum torque limits for the first and second EDUs 5, 6. Thus, the first torque range TR1 defines a minimum front torque and a maximum front torque for transmission to the front axle 3; and the second torque range TR2 defines a minimum rear torque and a maximum rear torque for transmission to the rear axle 4. The first torque range TR1 and/or the second torque range TR2 may comprise a static, pre-defined torque range for the respective first and second electric machines 7, 10, for example −3000 Nm to +3000 Nm with 10 Nm steps. Alternatively, or in addition, the first torque range TR1 and/or the second torque range TR2 may be capped by a minimum/maximum torque limit, for example dependent on an operating speed of the respective first and second electric machines 7, 10. Alternatively, or in addition, the first torque range TR1 and/or the second torque range TR2 may be determined in dependence on operating limits, for example one or more of the following set: traction battery power limit, inverter limits and transmission limits. Alternatively, or in addition, the first torque range TR1 and/or the second torque range TR2 may be determined to maintain dynamic stability of the vehicle. At least in certain embodiments, the first and second torque ranges TR1, TR2 may be dynamic ranges and may vary in dependence on current or predicted operating conditions.

The first and second torque ranges TR1, TR2 are output to the torque split module 23. The torque split module 23 is operative to control the torque transmitted to the front and rear axles 3, 4 to meet the total requested torque TQ. The torque split module 23 is operative to optimise the efficiency of the first and second electric machines 7, 10 within the first and second torque ranges TR1, TR2. In certain embodiments, the torque split module 23 may be configured to optimise the overall combined efficiency of the first and second EDUs 3, 4, for example considering the operating efficiencies of the first and second inverters 8, 11 and/or the first and second gearbox/differentials 9, 12. As described herein, the torque split module 23 is configured to generate the front and rear torque demand signals DS1, DS2 to control operation of the first and second electric machines 7, 10. The front torque demand signal DS1 comprises a front torque request TQ1 for the first electric machine 7; and the rear torque rear torque demand signal DS2 comprises a rear torque request TQ2 for the second electric machine 10. The aggregate of each complementary pair of front and rear torque requests TQ2$s$, TQ2 is at least substantially equal to the total requested torque TQ. The torque split module 23 is configured to receive first and second motor speed signals MS1, MS2. The torque split module 23 is also configured to receive first and second temperature signals TS1, TS2 relating to the respective first and second EDUs 5, 6. The first temperature signal TS1 comprises one or more of the following set: a temperature of the first electric machine 7 (rotor and/or stator temperature); a temperature of the first inverter 8; and a temperature of the first gearbox/differential 9. The second temperature signal TS2 comprises one or more of the following: a temperature of the second electric machine 10 (rotor and/or stator temperature); a temperature of the second inverter 11, and a temperature of the second gearbox/differential 12. The first temperature signal TS1 and/or the second temperature signal TS2 may be measured by one or more sensors (not shown) coupled to the respective components. Alternatively, the first temperature signal TS1 and/or the second temperature signal TS2 may be estimated by respective thermal models, for example in dependence on operating conditions or loads of the respective components. The operation of the torque split module 23 to generate the front and rear torque demand signals DS1, DS2.

The front and rear torque demand signals DS1, DS2 are output to the torque shaping module 24. The torque shaping module 24 is configured to re-profile the front and rear torque demand signals DS1, DS2 and to generate front and rear final torque demand signals DSF1, DSF2 which are output to the respective first and second inverters 8, 11. The first and second inverters 8, 11 control operation of the first and second electric machines 7, 10 in dependence on said front and rear final torque demand signals DSF1, DSF2. As outlined above, the first and second electric machines 7, 10 may generate a positive torque for propelling the vehicle 1 or a negative torque to slow the vehicle 1. The first and second electric machine 7, 10 may be configured to regenerate energy under braking, for example to recharge the traction battery.

The torque split module 23 is configured to determine the corresponding torque split between the first and second propulsion units 5, 6. The front and rear torque demand signals DS1, DS2 are generated such that the front and rear torque requests TQ1, TQ2 correspond to the determined torque split. The torque split module 23 receives the first and second torque ranges TR1, TR2 and determines the optimum torque split between the first and second EDUs 5, 6 to meet the total requested torque TQ. The relationship between the total requested torque TQ and the first and second torque ranges TR1, TR2 is defined by the following equation:

$$TQ=\min(TR1)+\max(TR2)=\min(TR2)+\max(TR1) \quad (1)$$

The controller 2 is configured to implement a prediction module 25 for predicting first and second operating temperatures PT1, PT2 of the first and second electric machines 7, 10 respectively. As described herein, the predication module predicts the first and second predicted operating temperatures PT1, PT2 for at least a portion of a current route of the vehicle 1. The prediction module 25 is operable to assess whether the first and second predicted operating temperatures PT1, PT2 will exceed respective first and second temperature thresholds TTH1, TTH2. The first and second temperature thresholds TTH1, TTH2 may be predetermined, for example based on operating parameters of the first and second electric machines 7, 10. The first and second temperature thresholds TTH1, TTH2 may, for example, correspond to a predetermined temperature above which the first and second electric machines 7, 10 are de-rated to avoid damage. In the present embodiment the first and second temperature thresholds TTH1, TTH2 are the same for the first and second electric machines 7, 10. The assessment may, for example, determine if the first and second predicted operating temperatures PT1, PT2 will exceed the respective first and second temperature thresholds TTH1, TTH2 within a prescribed time period, for example within the next 5 minutes or 10 minutes. Alternatively, or in addition, the assessment may seek to identify a particular time or a particular time period when the first and second predicted operating temperatures PT1, PT2 is predicted to exceed the respective first and second temperature thresholds TTH1, TTH2. The first temperature threshold TTH1 in the present embodiment defines a maximum operating temperature for the first electric machine 7 above which the first electric machine 7 must be de-rated. The second temperature threshold TTH2 in the present embodiment defines a maximum operating temperature for the second electric machine 10 above which the second electric machine 10 must be de-rated.

The first and second predicted operating temperatures PT1, PT2 are determined in respect of a current route being undertaken by the vehicle 1. A route prediction algorithm may be provided to predict the current route, for example in dependence on a current position and a destination of the vehicle 1. The route prediction algorithm may be implemented by the prediction module 25. Alternatively, the route prediction algorithm may be implemented by a separate module, such as a satellite navigation module. The current position of the vehicle 1 may be determined by one or more on-board navigation systems, such as a Global Positioning System (GPS); communicating with an external device, such as a cellular telephone paired with the vehicle 1; or dead reckoning (DR) using a previously determined position and advancing that position based on known or estimated speeds over an elapsed time period for the current route. The destination of the vehicle 1 may be input by the user, for example corresponding to the destination specified in a satellite navigation system. Alternatively, or in addition, the destination may be determined in dependence on historic destination data, for example by referencing one or more previous destinations.

The prediction module 25 implements first and second thermal models to predict the respective first and second operating temperatures PT1, PT2. The first and second thermal models are operative to model the thermal behaviour of the first and second electric machines 7, 10 in dependence on expected power consumption over the current route. In the present embodiment, the prediction module 25 predicts the first and second predicted operating temperatures PT1, PT2 of the first and second electric machines 7, 10 in dependence on an expected power consumption along the current route. The first and second predicted operating temperatures PT1, PT2 are determined at least in part in dependence on route information INF1 relating to the current route. By way of example, the first and second thermal models implemented by the prediction module 25 may predict the load on each of the first and second electric machines 7, 10 based at least in part on the route information INF1 relating to the current route. The power consumption by the first and second electric machines 7, 10 may differ depending on the load conditions encountered along the current route, resulting in different first and second operating temperatures PT1, PT2. The first and second electric machines 7, 10 may be required to generate different traction and regenerative torques from each other, resulting in uneven power consumption (and thermal behaviour). These scenarios may prevail if there are significant elevation changes in the current route, for example ascending and/or descending a mountainous route. The first and second predicted operating temperatures PT1, PT2 may be estimated for at least a portion of the current route in dependence on the predicted load. If the prediction module 25 determines that the vehicle 1 has traveled along part or all of the same route previously, the prediction module 25 may optionally reference historic data associated with that particular route. The historic data may comprise temperature data measured by one or more temperature sensors associated with said first and second electric machines 7, 10. Alternatively, or in addition, the historic data may comprise load data representing the loads applied to the first and second electric machines 7, 10.

The route information INF1 may include one or more of the following set: road gradient, road curvature, road elevation (for example comprising positive elevation changes and/or negative elevation changes for the current route), speed limits or restrictions, traffic light location(s), roundabout location(s) and traffic volume (congestion) data, roadworks and other road obstructions. Alternatively, or in addition, the route information INF1 may include historic data comprising one or more of the following set: rate of acceleration and/or deceleration, driving speed, average speed for a given route and driving style (which may be associated with a particular driver). Alternatively, or in addition, the route information INF1 may comprise information measured by one or more sensors provided on the vehicle 1, for example, moving objects, pedestrians, cyclists and other vehicles. Alternatively, or in addition, the route information INF1 may include known or forecast ambient air temperature or weather conditions (such as precipitation) for part or all of the current route. At least some of the route information INF1 may be accessed from a database. The database may be held in a storage device which is disposed in the vehicle or which may be accessed remotely, for example over a wireless communication network. Suitable resources for some or all of the route information INF1 include the eHorizon system offered by Continental AG, and the Car2X system offered by Siemens Aktiengesellschaft. Alternatively, or in addition, the route information INF1 may comprise data generated by one or more vehicle sensors. The vehicle sensors may, for example, comprise one or more of the following set: a radar system, an optical or infrared camera, a lidar scanner, an inertial sensor and an accelerometer. The route information INF1 may relate to the entirety of the current route or a portion of the current route.

Figure 3:
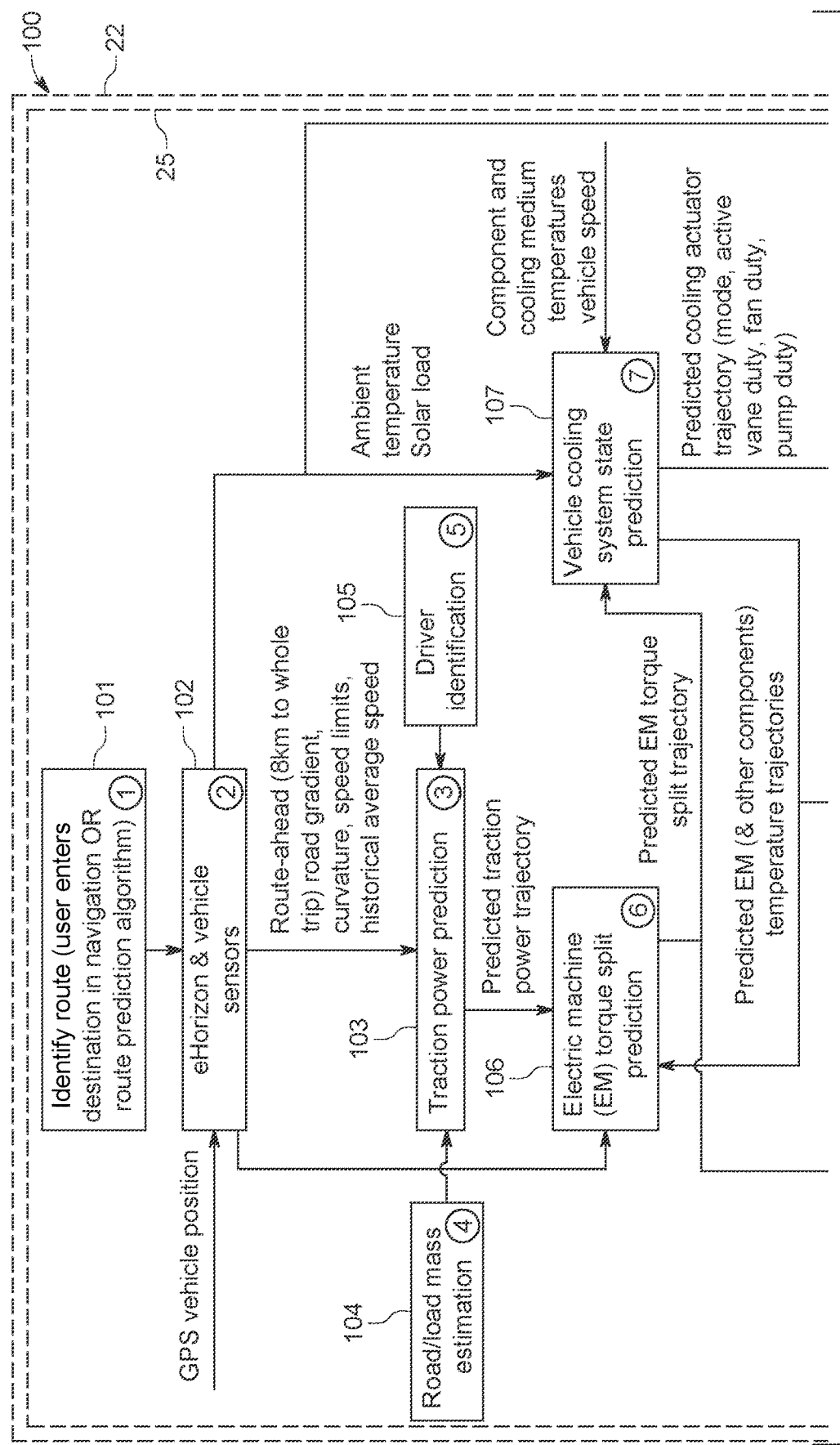
FIG. 3 shows a flow diagram illustrating the operation of a prediction module in accordance with the present invention.
Figure 3:
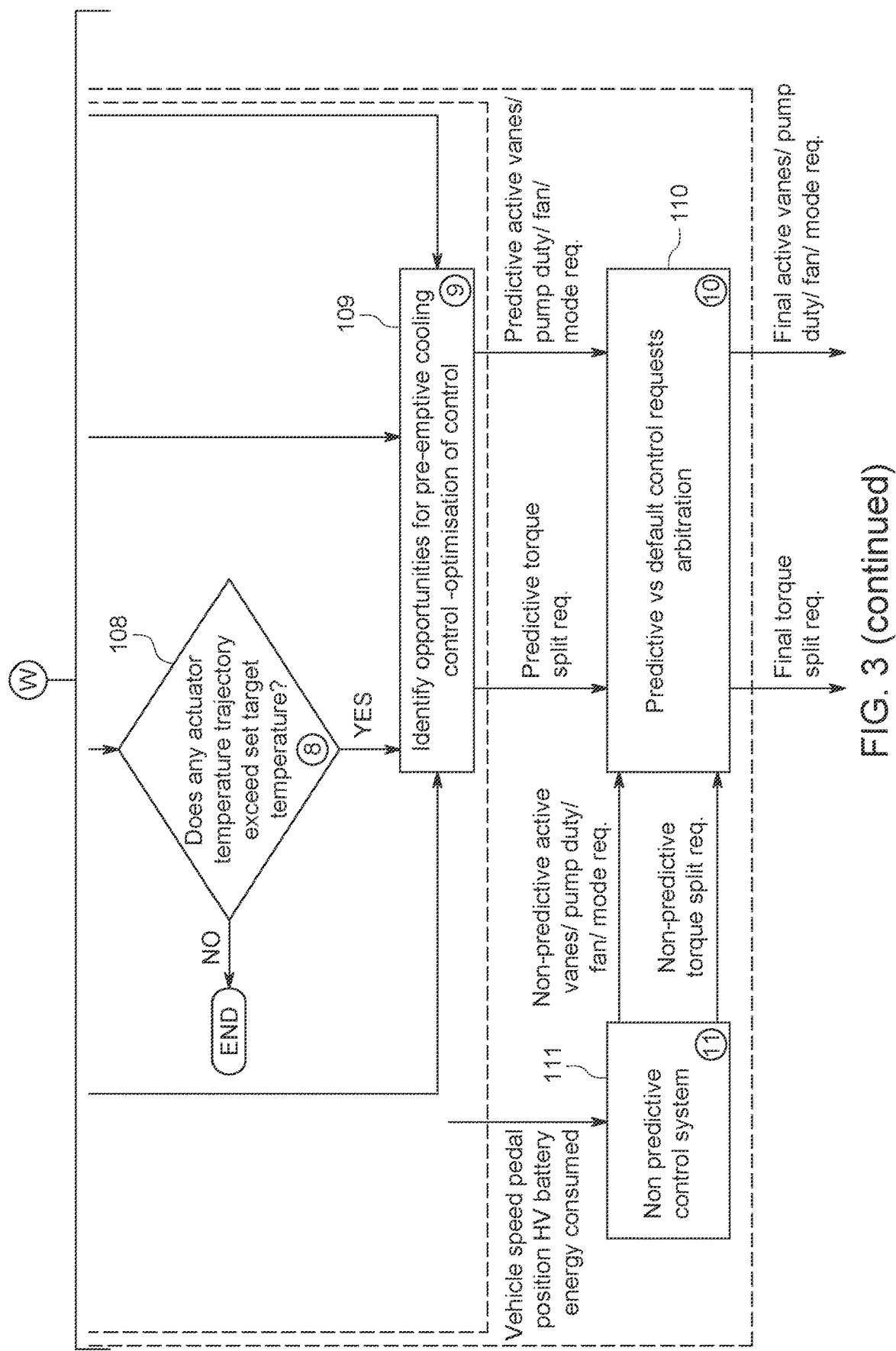

The operation of the prediction module 25 will now be described with reference to a block diagram 100 shown in FIG. 3. The route prediction algorithm identifies the current route (BLOCK 101). The identified route may correspond to a whole journey; or may comprise a rolling horizon, for example corresponding to the next x km in the current route (for example, a rolling horizon of 8 km which is updated every 1 km or every 2 kms). The route may be identified when the user enters the destination in the satellite navigation or using the route prediction algorithm described herein. The route information INF1 relating to the predicted current route is then accessed (BLOCK 102). As described herein, the route information INF1 may be obtained from a database (stored locally or remotely) and/or one or more vehicle sensors. The prediction module 25 is operative to predict a total tractive power requirement at the wheels W1-4 of the vehicle 1 while it travels along the predicted current route (BLOCK 103). The traction power requirements may optionally also reference road/load estimations (BLOCK 104). Alternatively, or in addition, the traction power requirements may identify the driver of the vehicle 1 (BLOCK 105) to make allowances for driving style. A prediction is made of the total tractive power requirement at the wheels W1-4 of the vehicle 1. In dependence on the predicted total tractive power requirement, and the route information INF1, the prediction module 25 calculates a trajectory (or profile) of the torque split between the first and second electric machines 7, 10 (BLOCK 106). The prediction module 25 may optimise the torque split between the first and second EDUs 5, 6 for energy usage of the propulsion system, whilst optionally satisfying one or more of the following requirements: vehicle stability, traction and driveability. The temperature trajectory is calculated for each of the first and second electric machines 7, 10 in dependence on one or more of the following set: the calculated trajectory of the torque split between the first and second EDUs 5, 6; ambient conditions; system/component temperatures; other vehicle sensor information and the route information INF1 (BLOCK 107). The temperature trajectories of the first and second electric machines 7, 10 are compared to the first and second temperature thresholds TTH1, TTH2 respectively (BLOCK 108). If neither of the first and second predicted operating temperatures PT1, PT2 exceed the first and second temperature thresholds TTH1, TTH2, the algorithm is terminated (END). If one or both of the first and second predicted operating temperatures PT1, PT2 exceeds the respective first and second temperature thresholds TTH1, TTH2 the prediction module 25 identifies opportunities for more effective cooling and/or increased torque split between the first and second electric machines 7, 10 (BLOCK 109). The predicted temperature trajectories may optionally be used to control one or more cooling subsystems in the vehicle 1; and/or to optimise control of the first and second electric machines 7, 10. The prediction module 25 outputs control signals comprising a predictive torque split requirement and/or a predictive cooling subsystem requirement. The predictive torque split requirement may be expressed in terms of a temperature target trajectory and a closed-loop controller acting on torque split to maintain the tracking error within pre-specified tolerance. The tolerance may, for example, be proportional to the predicted operating temperature of the traction machines.

The controller 2 receives the control signals from the prediction module 25 and performs a final arbitration between predictive and non-predictive torque split requirements and/or cooling subsystem requirements (BLOCK 110). The non-predictive control systems in the controller 2, such as the torque split module 23, receive current vehicle operating parameters and output non-predictive torque split requirements and/or cooling subsystem requirements (BLOCK 111). The current vehicle operating parameters may comprise one or more of the following set: vehicle speed (VREF), accelerator pedal position, brake pedal position, traction motor operating temperatures, and energy consumed by the high voltage (HV) battery. It will be understood that the current vehicle operating parameters may be measured and/or estimated. The controller 2 determines an appropriate level of compensation in dependence on the received predictive and non-predictive signals. The controller 2 outputs the final front and rear torque demand signals DSF1, DSF2 corresponding to the final torque split between the front and rear axles 3, 4; and/or the final cooling subsystem control signals.

As outlined above, if one or both of the first and second predicted operating temperatures PT1, PT2 predicted by the prediction module 25 exceeds the first and second temperature thresholds TTH1, TTH2, the prediction module 25 may identify opportunities for a more effective torque split between the first and second electric machines 7, 10. In particular, the first and second electric machines 7, 10 may be controlled in dependence on the predicted temperature trajectories of the first and second electric machines 7, 10 for part or all of the current route. The trajectory of the torque split between the first and second electric machines 7, 10 is determined in dependence on the first and second predicted operating temperatures PT1, PT2.

The torque split module 23 is configured to determine the proportion of the total requested torque TQ generated by each of the first and second electric machines 7, 10. In accordance with an aspect of the present invention, the torque split between the first and second electric machines 7, 10 is controlled to increase, and preferably to maximise, the period of time during the current route when the operating temperature of the first and second electric machines 7, 10 is below the first and second temperature thresholds TTH1, TTH2. In the present embodiment, first and second power penalties PP1, PP2 are calculated in respect of the predicted operating temperatures PT1, PT2 of the first and second electric machines 7, 10 for the current route.

The first and second power penalties PP1, PP2 are calculated in respect of each of the first and second electric machines 7, 10. The first and second power penalties PP1, PP2 are applied to provide a bias against activating either of the first and second electric machines 7, 10 if the prediction module 25 determines that the predicted operating temperatures PT1, PT2 of the first and second electric machines 7, 10 will exceed the first and second temperature thresholds TTH1, TTH2 respectively.

Figure 5:
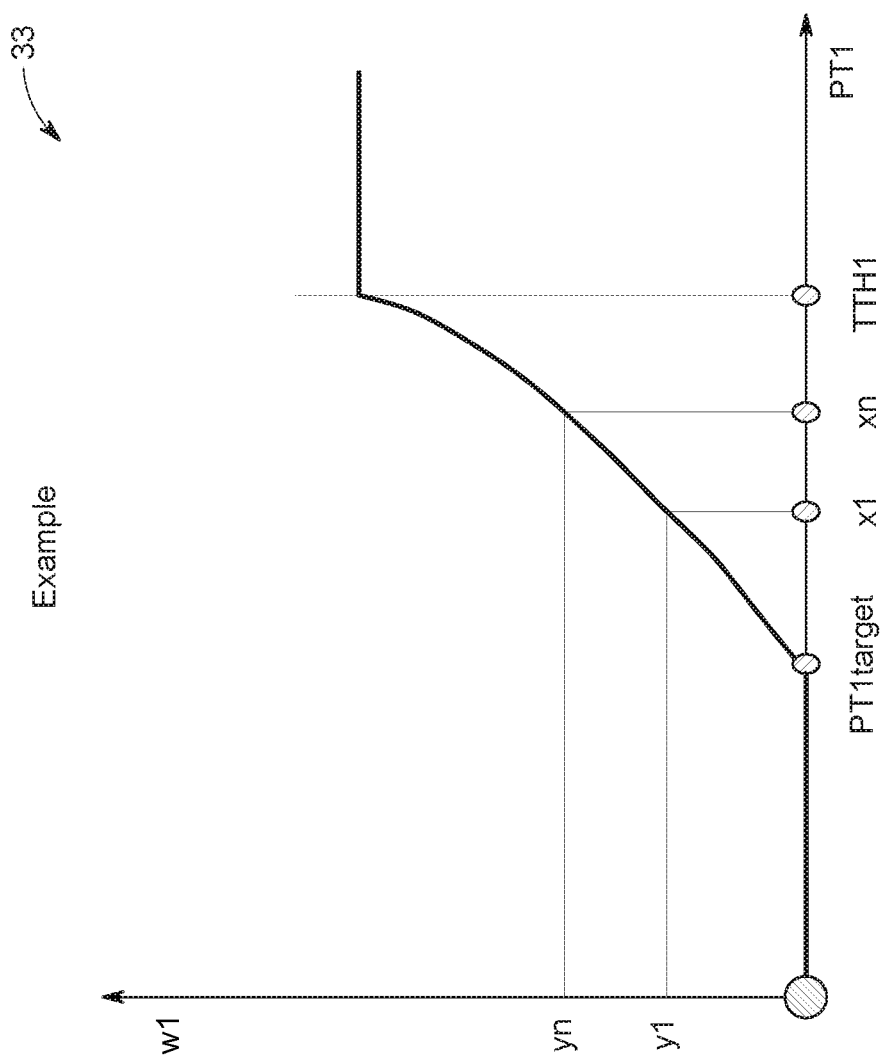
FIG. 5 illustrates a chart representing a penalty table for calculating a penalty power loss based on an operating temperature of the first electric machine.

A first mechanical power factor is calculated by multiplying the front torque request TQ1 and the operating speed of the first electric machine 7. The first mechanical power factor and a first penalty factor W1 are multiplied together to determine the first power penalties PP1. The relationship between a first penalty factor W1 and an operating temperature of the first electric machine 7 is illustrated in a first penalty chart 33 shown in FIG. 5. The first penalty chart 33 represents a penalty table for calculating the first penalty factor W1 in dependence on the first predicted operating temperature PT1 of the first electric machine 7. As illustrated in FIG. 5, the first penalty factor W1 is at a minimum (for example zero) when the first predicted operating temperature PT1 is less than or equal to a first target temperature PT1target for the first electric machine 7. The first penalty factor W1 increases when the first predicted operating temperature PT1 is greater than the first target temperature PT1target for the first electric machine 7. A second mechanical power factor is calculated by multiplying the rear torque request TQ2 and the operating speed of the second electric machine 10. A second penalty factor W2 is derived from a second penalty chart (not shown) in dependence on the predicted operating temperature PT2 of the second electric machine 10. The second penalty factor W2 is at a minimum (for example zero) when the second predicted operating temperature PT2 is below a second target temperature PT2target for the second electric machine 10. The second penalty factor W2 increases when the second predicted operating temperature PT2 is greater than the second target temperature PT2target for the second electric machine 10. The second mechanical power factor and the second penalty factor W2 are multiplied together to determine the second power penalty PP2. It will be understood that the first and second power penalties PP1, PP2 may be integrated into first and second motor maps defined for the first and second electric machines 7, 10. For example, the first and second motor maps may include a penalty associated with the temperature of the respective first and second electric machines 7, 10 to bias the torque split away from one or other of said first and second electric machines 7, 10 as the operating temperature approaches the respective first and second temperature thresholds TTH1, TTH2. The first target temperature PT1target and/or the second target temperature PT2target may be fixed. Alternatively, as described below, the first target temperature PT1target and/or the second target temperature PT2target may be calculated dynamically.

The first power penalty PP1 is increased if the first predicted operating temperature PT1 (i.e. the predicted operating temperature of the first electric machine 7) is predicted to exceed the first temperature threshold TTH1 within a predetermined time period or a predetermined distance. Alternatively, or in addition, the first power penalty PP1 may be increased if the rate at which the first predicted operating temperature PT1 is increasing exceeds a first predetermined rate change threshold (corresponding a gradient of the first predicted operating temperature PT1) within a predetermined time period or a predetermined distance. The second power penalty PP2 is increased if the second predicted operating temperature PT2 (i.e. the predicted operating temperature of the second electric machine 10) is predicted to exceed the second temperature threshold TTH2 within a predetermined time period or a predetermined distance. Alternatively, or in addition, the second power penalty PP2 may be increased if the rate at which the second predicted operating temperature PT2 is increasing exceeds a second predetermined rate change threshold (corresponding a gradient of the second predicted operating temperature PT2) within a predetermined time period or a predetermined distance.

The torque split module 23 is configured to reduce the proportion of the total requested torque generated by the first electric machine 7 in dependence on an increase in the first power penalty PP1. The torque split module 23 is configured to reduce the proportion of the total requested torque generated by the second electric machine 10 in dependence on an increase in the second power penalty PP2. The torque split module 23 may optionally be configured to determine the front and rear torques TQ1, TQ2 within the respective first and second torque ranges TR1, TR2 determined by the traction and handling control module 22.

The first power penalty PP1 may be derived from the first penalty chart 33 in dependence on the predicted operating temperature PT1 of the first electric machine 7. The first power penalty PP1 may be proportional to the magnitude of the predicted operating temperature PT1 of the first electric machine 7. Alternatively, or in addition, the first power penalty PP1 may be proportional to the period of time at which the predicted operating temperature PT1 of the first electric machine 7 is above the first temperature threshold TTH1. The prediction module 25 could, for example, integrate the trajectory of the first predicted operating temperature PT1 with respect to time. The second power penalty PP2 may be derived from a second lookup table in dependence on the predicted operating temperature PT2 of the second electric machine 10. The second power penalty PP2 may be proportional to the magnitude of the predicted operating temperature PT2 of the second electric machine 10. Alternatively, or in addition, the second power penalty PP2 may be proportional to the period of time at which the predicted operating temperature PT2 of the second electric machine 10 is above the second temperature threshold TTH2. The prediction module 25 could, for example, integrate the trajectory of the second predicted operating temperature with respect to time.

Figure 6:
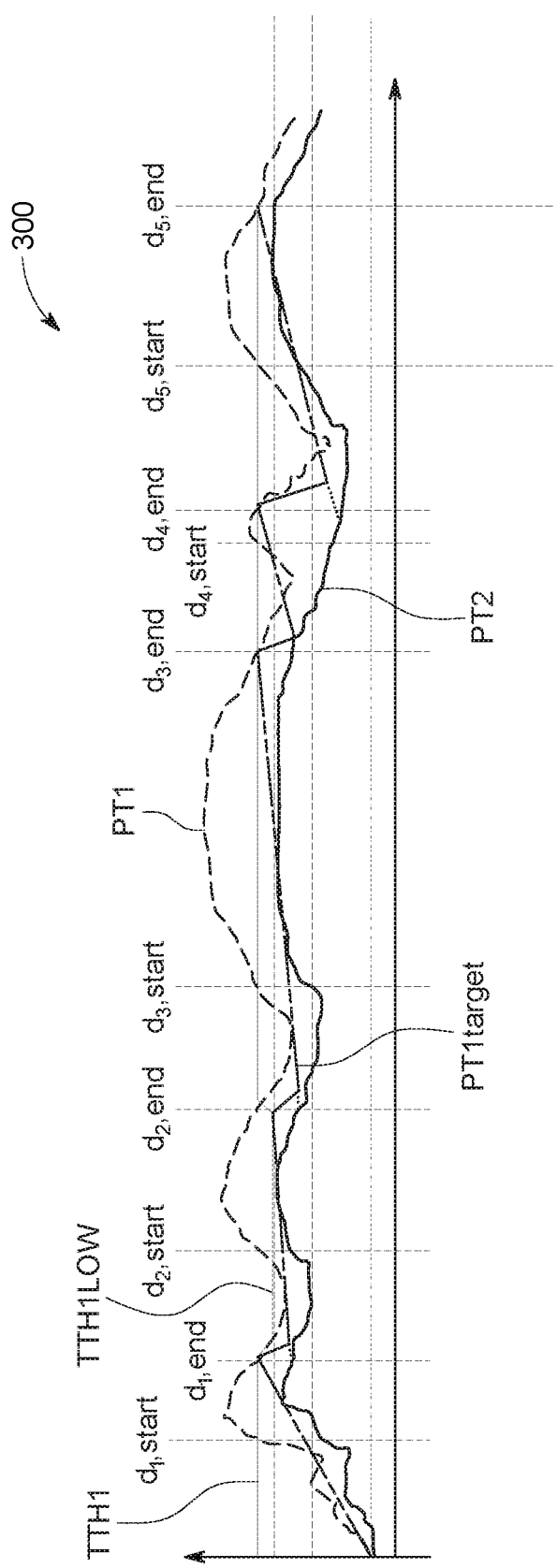
FIG. 6 illustrates the dynamic calculation of the temperature threshold and the target temperature in dependence on the predicted operating temperature of first and second electric machines for the current route.

As outlined above, the first target temperature PT1target and/or the second target temperature PT2target may be calculated dynamically. A second chart 300 illustrating a dynamically calculated first temperature threshold TTH1 is shown in FIG. 6. As illustrated in FIG. 6, the first target temperature PT1target is calculated in dependence on de-rate events when the output torque of the first electric machine 7 is restricted, for example to prevent damage due to over-heating. The de-rate events occur when the first predicted operating temperature PT1 exceeds the first temperature threshold TTH1. Thus, the prediction module 25 can predict when one or more de-rate events will occur during the current route. The first target temperature PT1target is calculated with reference to the first predicted operating temperature PT1 at the end of successive de-rate events. The first target temperature PT1target comprises a target line connecting the first predicted operating temperature PT1 at the end of a first de-rate event to the first predicted temperature PT1 at the end of a second de-rate event. The target line in the present embodiment are linear but they may be non-linear, for example comprising a curve. As shown in FIG. 6, the first and second de-rate events are successive de-rate events, as determined in dependence on the first predicted temperature PT1. The end of each de-rate event is identified by the first predicted temperature PT1 dropping below the first temperature threshold TTH1. The first temperature target PT1target can be used as a dynamic breakpoint. The first temperature threshold TTH1 could also be considered as a dynamic breakpoint which can be lowered to create "headroom" for further de-rate events of the first electric machine 7 along the current route. With reference to FIG. 5, any intermediate breakpoints x1, xn between the first target temperature PT1target and the first temperature threshold TTH1 could be expressed as a percentage of the interval between the first target temperature PT1target and the first temperature threshold TTH1. It will be understood that the second target temperature PT2target may be calculated using the same technique with respect to the second predicted temperatures PT2 and the second temperature threshold TTH2.

The torque split module 23 generates a front torque demand signal DS1 comprising a front torque TQ1, and a rear torque demand signal DS2 comprising a rear torque TQ2. The front and rear torque demand signals DS1, DS2 are output to the torque shaping module 24. The torque shaping module 24 outputs final front and rear torque demand signals DSF1, DSF2 to the first and second inverters 8, 11 respectively. The first and second electric machines 7, 10 are controlled in dependence on final front and rear torque demand signals DSF1, DSF2 to transmit front and rear torques TQ1, TQ2 to the front and rear axles 3, 4. The front and rear torques TQ1, TQ2 are complementary and are at least substantially equal to the total requested torque.

Figure 4:
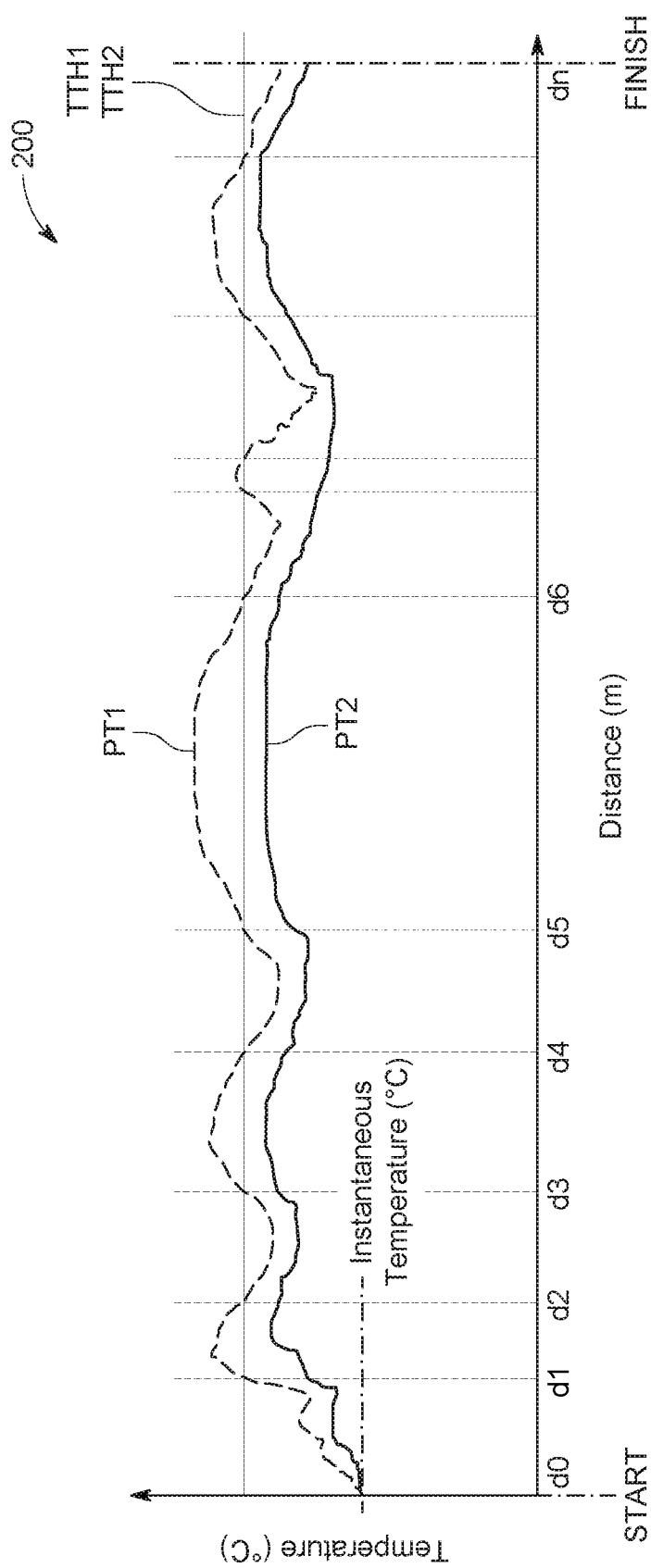
FIG. 4 illustrates a temperature trajectory of the first and second electric machines predicted in dependence on route information for a current route of the vehicle.

A first chart 200 showing an exemplary representation of the trajectory of the first and second predicted operating temperatures PT1, PT2 for a current route is shown in FIG. 4. In the illustrated example, the prediction module 25 predicts that the first predicted operating temperature PT1 will exceed the first temperature threshold TTH1 at a first distance d1, and that the first predicted operating temperature PT1 will remain above the first temperature threshold TTH1 until a second time t2. During the first distance interval (d1 to d2), the prediction module 25 determines that the second predicted operating temperature PT2 will remain below the second temperature threshold TTH2. The prediction module 25 identifies this first distance interval (d1 to d2) as an opportunity to increase the proportion of the total requested torque generated by the second electric machine 10. By identifying this opportunity in advance (i.e. before distance d1), the prediction module 25 can pre-emptively increase the proportion of the total requested torque generated by the second electric machine 10 before the first predicted operating temperature PT1 exceeds the first temperature threshold TTH1. At least in certain scenarios this may allow the operating temperature of the first electric machine 7 to be reduced. The prediction module 25 may update the first and second predicted operating temperatures PT1, PT2 either in real time or at predetermined intervals (either time or distance). Further opportunities to adjust the torque split are identified in respect of the distance intervals d3 to d4; d5 to d6 and so on in FIG. 4. It will be understood that different operating conditions for the vehicle 1 may result in the second predicted operating temperature PT2 increasing above the second temperature threshold TTH2. At least in certain embodiments, the pre-emptive control of the first and second electric machines 7, 10 to manage their respective operating temperatures may provide efficiency benefits. The need to activate vehicle cooling subsystems, such as active cooling vanes and cooling pumps, may be reduced. By way of example, if the temperature of the first electric machine 7 exceeds the first temperature threshold TTH1, for example in the first distance interval d1 to d2 in the scenario illustrated in FIG. 4, the first electric machine 7 would have to be de-rated and the vehicle cooling subsystems operated in high duty mode to reduce the operating temperature. The pre-emptive adjustment of the torque split between said first and second electric machines 7, 10 prior to the operating temperature of the first electric machine 7 exceeding the first temperature threshold TTH1 may reduce the need for activation of said vehicle cooling subsystems. It will be understood that predicting the operating temperature of said first and second electric machines 7, 10 may also enable pre-emptive activation of the vehicle cooling subsystems, for example to enable operation in more efficient cooling modes.

The first and second temperature thresholds TTH1, TTH2 may be fixed. However, in certain embodiments, the first and second temperature thresholds TTH1, TTH2 may be calculated dynamically. In certain embodiments, the prediction module 25 may set the first temperature threshold TTH1 and/or the second temperature threshold TTH2 in dependence on the first and second predicted temperatures PT1, PT2. For example, if the prediction module 25 determines that there is insufficient cooling capacity available during a portion of the current journey, the first temperature threshold TTH1 and/or the second temperature threshold TTH2 may be reduced prior to the predicted scenario. This is illustrated in FIG. 6 by a lowered first temperature threshold TTH1LOW. Conversely, if the prediction module 25 determines that there is excess cooling capacity available during a portion of the current journey, the first temperature threshold TTH1 and/or the second temperature threshold TTH2 may be increased prior to the predicted scenario.

As outlined above, the prediction module 25 may optimise the torque split between the first and second EDUs 5, 6 to satisfy one or more of the following requirements: vehicle stability, traction and driveability. The prediction module 25 may predict the vehicle stability for a section of the route in dependence on an estimated vehicle speed profile and a predicted longitudinal acceleration. Alternatively, or in addition, the prediction module 25 may predict the vehicle stability in dependence on one or more of the following: a predicted lateral acceleration, an estimated coefficient of friction ($\mu$) of the surface over which the vehicle 1 is traveling, or other conditions that have an effect on the traction available to a moving vehicle. The prediction module 25 may predict vehicle stability under a range of dynamic operating conditions of the vehicle 1, for example approaching a bend and/or mild acceleration. The prediction module 25 may predict wheel slip for each wheel W1-4 based on road topology and/or driver style. The vehicle speed profile, the longitudinal acceleration and the lateral acceleration may be predicted in dependence on route topography, for example derived from the route information INF1. The predicted lateral acceleration can be proportional to the curvature of the road and a predicted speed.

As shown in FIG. 2, the controller 2 determines vehicle speed (historical and current), road gradient and curvature. From this information, together with a road load/mass estimation, the predicted lateral and longitudinal acceleration of the vehicle 1 can be calculated. For example, the longitudinal acceleration can be calculated using Newton's second law. Alternatively, or in addition, one or more of the vehicle speed profile, the longitudinal acceleration and the lateral acceleration may be predicted in dependence on historical data, for example derived from dynamic data recorded previously in respect of the same route or a route having similar topographical features.

The coefficient of friction ($\mu$) represents the friction between the vehicle wheels W1-4 and a driving surface, for example a surface of a road on which the vehicle 1 is travelling. A coefficient of friction estimator (not shown) may enhance the prediction. Alternatively, the coefficient of friction ($\mu$) may be estimated based on prevailing conditions, such as local weather conditions on the current route; and/or historic data recorded for the current route. The coefficient of friction ($\mu$) may be determined via communication with other vehicles on the current route, either direct communication between the vehicle 1 and other vehicle(s) (vehicle-to-vehicle communication), or indirect communication with the other vehicle(s) (vehicle-to-infrastructure communication). The coefficient of friction estimator could be implemented locally (i.e. by a processor provided on the vehicle 1), or in a remote processor (for example a "cloud" processor). The coefficient of friction estimator may receive traction information from the other vehicle(s) and estimate a coefficient of friction for certain segments or portions of the road. It will be understood that the estimated coefficient of friction is time dependent, as weather conditions and road conditions are variable.

Driver identification can be used to enhance the prediction techniques described herein. The prediction module 25 may optionally predict the vehicle speed profile, the longitudinal acceleration and the lateral acceleration in dependence on driver style, for example derived from historical dynamic data stored for a particular driver. Each driver has a variable threshold to lateral acceleration. Based on historical information, the prediction module 25 may model driver behaviour, for example to predict a relationship between lateral acceleration and road curvature. The prediction module 25 may predict driver characteristics in terms of longitudinal acceleration, for example a speed profile when approaching and/or departing roundabouts, junctions, changes in the applicable legislative speed limit, etc.

The predicted vehicle stability may define traction-stability system limits. The traction-stability system limits may comprise maximum and minimum limits for each of the first and second electric machines 7, 10 at the wheel frame of reference, i.e. actuator limits converted to wheel frame of reference by accounting for the transmission ratio and losses. The predicted vehicle stability may be used to determine the first and second torque ranges TR1, TR2. The torque split module 23 may determine the front and rear torques TQ1, TQ2 within the resulting torque ranges TR1, TR2. At least in certain embodiments, this may enhance the prediction of the propulsion system state and thus facilitate an improved optimisation to mitigate thermal de-rates. For example, the first power penalty PP1 and/or the second power penalty PP2 may be determined in dependence on the predicted vehicle stability.

Figure 7:
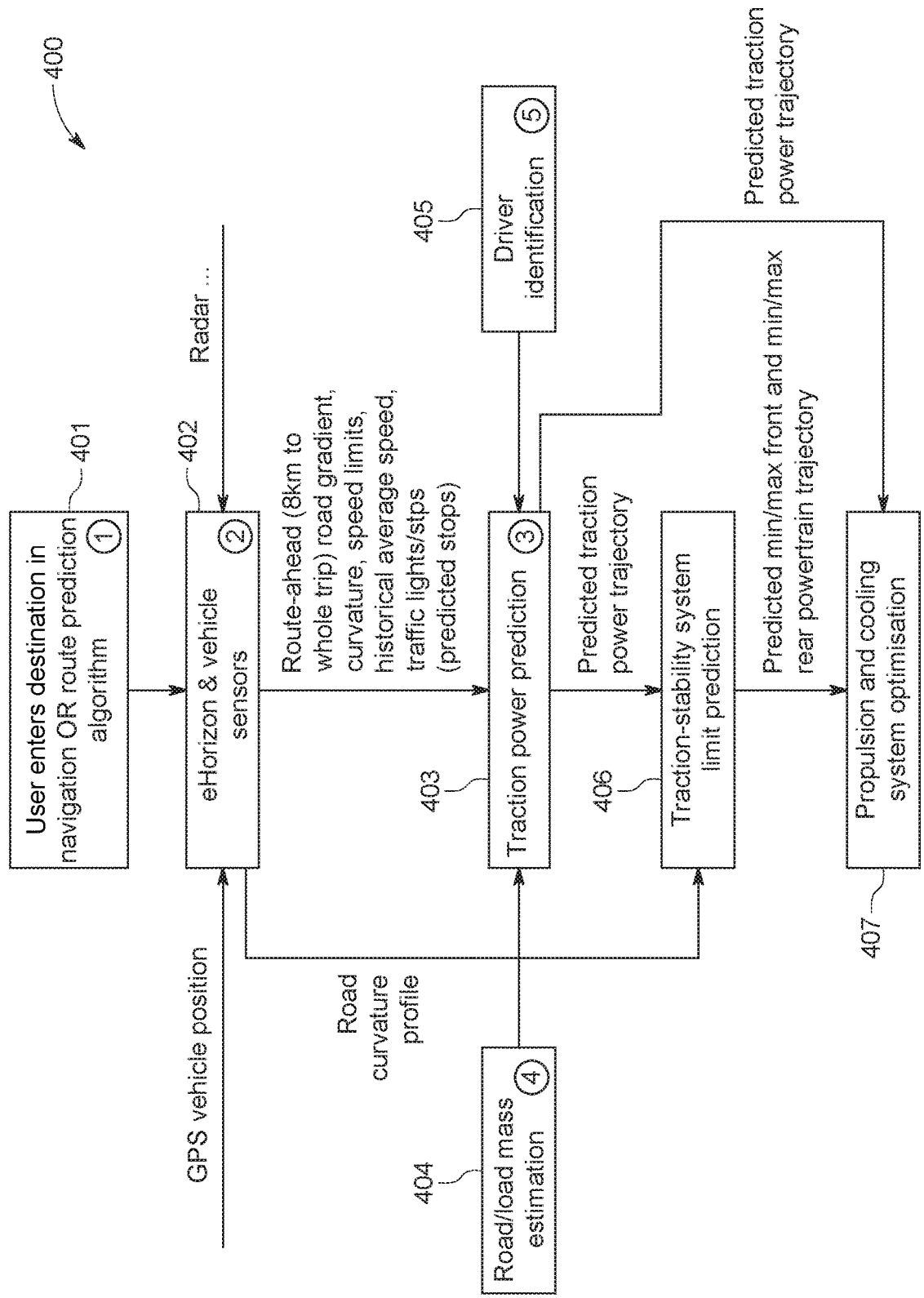
FIG. 7 shows a second block diagram illustrating operation of the controller to predict vehicle stability.

The operation of the prediction module 25 to determine the vehicle stability will now be described with reference to a second block diagram 400 shown in FIG. 7. The route prediction algorithm identifies the current route (BLOCK 401). The identified route may correspond to a whole journey; or may comprise a rolling horizon, for example corresponding to the next x km in the current route (for example, a rolling horizon of 8 km which is updated every 1 km or every 2 kms). The route may be identified when the user enters the destination in the satellite navigation or using the route prediction algorithm described herein. The route information INF1 relating to the predicted current route is then accessed (BLOCK 402). The route information INF1 may be obtained from a database (stored locally or remotely) and/or one or more vehicle sensors. A current location of the vehicle 1 may be determined from a navigation system, for example comprising a global positioning system (GPS) module. The prediction module 25 is operative to predict a total tractive power requirement at the wheels W1-4 of the vehicle 1 while it travels along the predicted current route (BLOCK 403). The traction power requirements may optionally also reference road/load estimations (BLOCK 404). Alternatively, or in addition, the traction power requirements may identify the driver of the vehicle 1 (BLOCK 405) to make allowances for driving style. A prediction is made of the total tractive power requirement at the wheels W1-4 of the vehicle 1. In dependence on the predicted total tractive power requirement, and the route information INF1, the prediction module 25 predicts traction-stability system limits comprising predicted maximum and minimum limits for each of the first and second electric machines 7, 10 (BLOCK 406). The operation of the propulsion and cooling systems are controlled in dependence on the predicted traction-stability system limits (BLOCK 407) to improve or optimise operating efficiency.

It will be appreciated that various modifications may be made to the embodiment(s) described herein without departing from the scope of the appended claims.

The embodiment described herein relates to a vehicle 1 having one electric machine per axle. It will be understood that aspects of the present invention may be applicable to other types of vehicles with electrical powertrains having different configurations. The present invention has been described with reference to an embodiment in which the first electric machine 7 is coupled to the front axle 3; and the second electric machine 10 is coupled to the rear axle 4. It will be understood that the first and second electric machines 7, 10 may be configured to transmit torque to the same axle (either the front axle 3 or the rear axle 4) or indeed the same wheel W1-4. Furthermore, the present invention may be used in a vehicle 1 comprising more than two electric machines 7, 10. For example, the vehicle 1 may comprise three (3) or four (4) electric machines operable to generate a traction torque and/or a regeneration torque.

The invention claimed is:

1. A controller for controlling operation of at least first and second traction machines in a vehicle, the controller comprising a processor configured to:
   predict an operating temperature of each of said at least first and second traction machines for at least a portion of a current route;
   determine at least first and second torque requests for said at least first and second traction machines, respectively, the at least first and second torque requests being determined based on the predicted operating temperatures of the at least first and second traction machines, respectively;
   generate at least first and second traction motor control signals based on the determined at least first and second torque requests, respectively;
   determine at least first and second power loss penalties based on the predicted operating temperatures of the at least first and second traction machines, respectively;
   determine a first predicted time when the operating temperature of the first traction machine is predicted to exceed a first temperature threshold; and
   increase the first power loss penalty a predetermined first time period prior to said first predicted time, the duration of the first time period being proportional to either or both of the predicted operating temperature and a predicted rate of change of the operating temperature of the first traction machine.

2. A controller as claimed in claim 1, wherein the at least first and second power loss penalties are proportional to the predicted operating temperature or a predicted rate of change of the operating temperature of the at least first and second traction machines, respectively.

3. A controller as claimed in claim 1, wherein the processor is further configured to determine the at least first and second torque requests based on said at least first and second power loss penalties, respectively.

4. A controller as claimed in claim 1, wherein the processor is further configured to:
   determine a second predicted time when the operating temperature of the second traction machine is predicted to exceed a second temperature threshold; and
   increase the second power loss penalty a predetermined second time period prior to said second predicted time.

5. A controller as claimed in claim 4, wherein the duration of the second time period is proportional to either or both of the predicted operating temperature and a predicted rate of change of the operating temperature of the second traction machine.

6. A controller as claimed in claim 1, wherein the processor is further configured to predict the operating temperature of the at least first and second traction machines based on an expected load of each of the at least first and second traction machines, respectively.

7. A controller as claimed in claim 1, wherein the processor is further configured to pre-emptively control one or more vehicle cooling subsystems based on the predicted operating temperatures of the at least first and second traction machines.

8. A vehicle comprising a controller as claimed in claim 1.

9. A controller as claimed in claim 1, wherein the processor is further configured to:
predict vehicle stability for at least the portion of a current route; and
determine the at least first and second torque requests based on the predicted vehicle stability.

10. A method of controlling operation of at least first and second traction machines in a vehicle, the method comprising:
predicting an operating temperature of each of said at least first and second traction machines for at least a portion of a current route;
determining at least first and second torque requests for said at least first and second traction machines, respectively, the at least first and second torque requests being determined based on the predicted operating temperatures of the at least first and second traction machines, respectively; and
controlling said at least first and second traction motor control signals based on the determined at least first and second torque requests, respectively;
determining at least first and second power loss penalties based on the predicted operating temperatures of the at least first and second traction machines, respectively; and
determining a first predicted time when the operating temperature of the first traction machine is predicted to exceed a first temperature threshold;
wherein the first power loss penalty is increased a predetermined first time period prior to said first predicted time, the duration of the first time period being proportional to either or both of the predicted operating temperature and a predicted rate of change of the operating temperature of the first traction machine.

11. A method as claimed in claim 10, wherein the at least first and second power loss penalties are proportional to the predicted operating temperature or a predicted rate of change of the operating temperature of the at least first and second traction machines, respectively.

12. A method as claimed in claim 10, further comprising determining the at least first and second torque requests based on said at least first and second power loss penalties, respectively.

13. A method as claimed in claim 10, further comprising:
determining a second predicted time when the operating temperature of the second traction machine is predicted to exceed a second temperature threshold; and
increasing the second power loss penalty a predetermined second time period prior to said second predicted time, wherein the duration of the second time period is proportional to either or both of the predicted operating temperature and a predicted rate of change of the operating temperature of the second traction machine.

14. A method as claimed in claim 10, further comprising predicting the operating temperature of the at least first and second traction machines based on an expected load of each of the at least first and second traction machines, respectively.

15. A method as claimed in claim 10, further comprising pre-emptively controlling one or more vehicle cooling subsystems based on the predicted operating temperatures of the at least first and second traction machines.

16. A non-transitory computer-readable medium having a set of instructions stored therein that, when executed, cause a processor to perform the method claimed in claim 10.

17. A method as claimed in claim 10, further comprising:
predicting vehicle stability for at least the portion of a current route; and
determining the at least first and second torque requests based on the predicted vehicle stability.

18. A method as claimed in claim 10, further comprising predicting vehicle stability based on one or more of the following: a vehicle speed profile, a longitudinal acceleration profile, a lateral acceleration profile, and a coefficient of friction.

* * * * *